United States Patent [19]

Blaise

[11] Patent Number: 4,756,682

[45] Date of Patent: Jul. 12, 1988

[54] MACHINE FOR THE EXTRUSION OF SEVERAL MATERIALS AT THE SAME TIME

[76] Inventor: Francois F. Blaise, 344 rue Paul Doumer, F-78510 Triel-sur-Seine, France

[21] Appl. No.: 50,939

[22] Filed: May 15, 1987

[30] Foreign Application Priority Data

May 16, 1986 [FR] France .............. 86 07035

[51] Int. Cl.$^4$ ............................................. B29C 47/02
[52] U.S. Cl. ............................. 425/113; 425/130; 425/131.1; 425/380; 425/462; 425/467
[58] Field of Search ............... 425/130, 114, 462, 466, 425/467, 113, 376 R, 376 A, 376 B, 378 R, 381, 380, 131.1, 133.1; 264/209.8, 209.2

[56] References Cited

U.S. PATENT DOCUMENTS

| | | | |
|---|---|---|---|
| 2,808,617 | 10/1957 | Terracini et al. | 425/462 |
| 3,266,092 | 8/1966 | Corbett | 425/462 |
| 3,837,773 | 9/1974 | Raley | 425/462 X |
| 4,087,222 | 5/1978 | Noel | 425/462 X |
| 4,137,027 | 1/1979 | Ruger | 425/462 X |
| 4,316,710 | 2/1982 | Greenwood | 425/462 X |
| 4,347,050 | 8/1982 | Figuereo | 264/209.8 X |
| 4,499,041 | 2/1985 | Hahn et al. | 425/462 X |

FOREIGN PATENT DOCUMENTS 454146  1/1949  Canada .............. 425/114

57-32918  2/1982  Japan .............. 425/462
58-87023  5/1983  Japan .............. 425/462

Primary Examiner—Richard L. Chiesa
Attorney, Agent, or Firm—Rodgers & Rodgers

[57] ABSTRACT

A machine is especially adapted for coating a profile insert and can be distinguished by the fact that it consists of several extruder screws (1, 2, 3) incorporated into a single block (4), each fed from a hopper opening, through a corresponding orifice (1', 2', 3'), into a union head (5) having a channel (6, 7, 8) for each material being extruded and hollowed out axially for an insert to pass through, this union head (5) feeding, via a distributor ring (9) perforated and grooved concentrically according to the channels in this head, an extrusion chamber (10) with controlled streams, carrying at its exit an extrusion head (11) with a reserved passage for the insert, the head consisting of a frustoconical liner (12) housing, between its entry and its exit, an externally ribbed diffuser (13), in which each groove between two ribs corresponds to an orifice of the extrusion chamber (10), an externally ribbed and grooved frustoconical core (13a) such that its ribs and grooves corresponds to those of the diffuser (13), a die (13b) hollowed out internally with conicity corresponding to the conicity of the radial ribs and grooves of the core (13a), this die comprising a passage cut out to the shape of the desired profile.

10 Claims, 6 Drawing Sheets

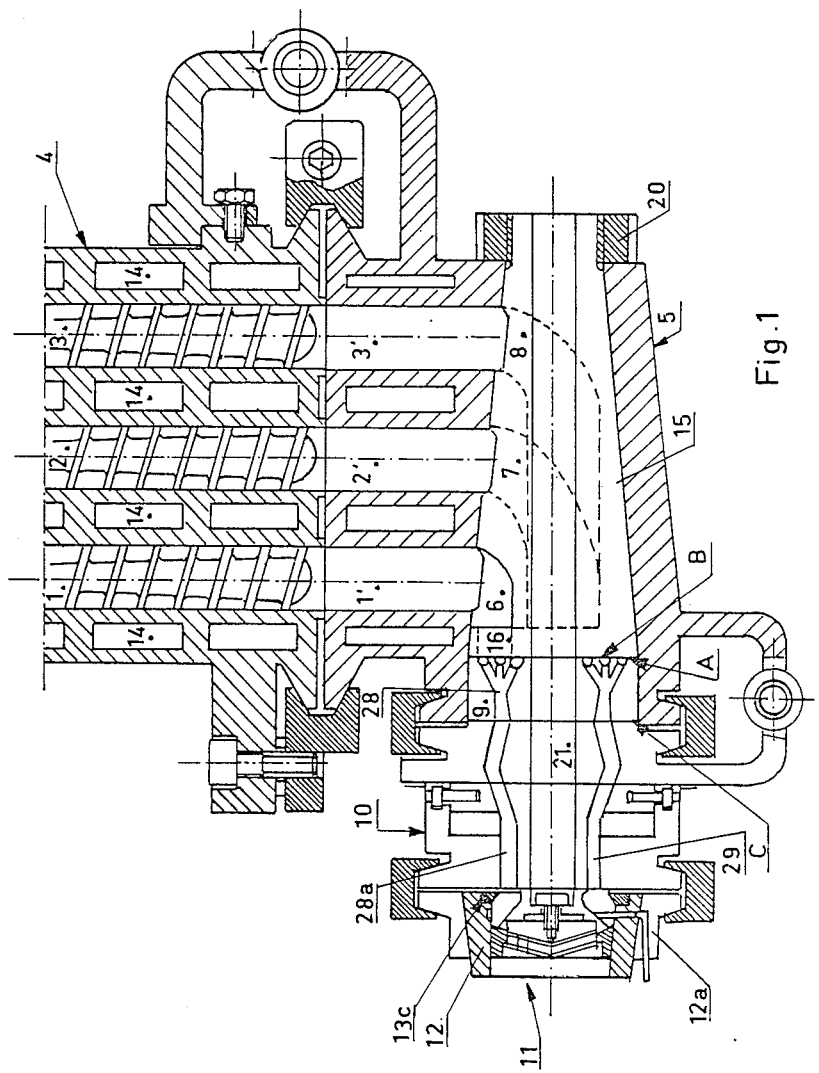

MACHINE FOR THE EXTRUSION OF SEVERAL MATERIALS AT THE SAME TIME

The present invention relates to a machine for the extrusion of several materials at the same time and, more particularly, it relates to a compact manufacturing machine of this kind, permitting continuous coating of a profile-shaped insert or continuous extrusion of a profile of complex shape, by employing various materials which are extruded at the same time by means of extruders arranged side by side in relation to one another.

In the technology of extrusion of thermoplastics or elastomers, for example, use is made at present of extrusion equipment which combines several extruders in a T or a Y layout, connected to a common extrusion head carrying the die. This equipment is not only large in size and consequently taking up much space, but it is complicated to implement, both insofar as the common extrusion head, which is heavy and complex, is concerned, and insofar as the die itself is concerned. Furthermore, when equipment of this kind is employed, for example for the extrusion of a bielastomeric, trielastomeric or reinforced plastomeric profile, the extruders are frequently underutilized and the speed of rotation of the extruder screws must be reduced, which gives rise to an increase in internal leakages and can be detrimental to the quality of the extruded profile.

In order to avoid most of the disadvantages presented by these known arrangements, the inventor has conceived an extrusion machine of a design which is of greatly reduced size in comparison with these arrangements and whose output is equivalent or higher than theirs.

According to the invention, an extrusion machine of this kind consists of several extruder screws incorporated into a single block, each fed from an individual hopper and opening out through a corresponding orifice into a union head having an individual channel for each material being extruded and hollowed out axially for an insert to pass through, this union head feeding, by means of a distributor ring which is perforated and grooved concentrically following the channels of the head, an extrusion chamber with controlled streams which is known in the art, carrying at its outlet an extrusion head with a reserved passage for the insert if the latter is to be embedded in the extruded profile, this extrusion head consisting of a frustoconical liner or jacket, housing, between its entry and its exit, an externally radially ribbed frustoconical diffuser, in which each groove between two radial ribs corresponds to an orifice of the extrusion chamber, an externally radially ribbed and grooved frustoconical core such that its ribs and grooves correspond to those of the diffuser, and a frustoconical die hollowed out internally in a conical manner corresponding to the conicity of the radial ribs and grooves of the core, this die obviously comprising a passage cut out to the shape of the desired profile.

More specifically and according to the invention, the extruder screws are housed in bores in the block which are parallel to each other and placed side by side, this block being provided with internal channels surrounding these screws in the manner of a radiator and circulating water and steam originating from the hydraulic motors for driving these screws in rotation.

Furthermore, the union head is an integral part of the extruder block and houses a frustoconical core bored out axially to provide the passage for the insert and provided with external grooves of substantially helicoidal shape, opening through segmentary annular orifices against the distributor ring, equal in number to that of the screws and each originating opposite the exit orifice of an extruder. It should be noted that the frustoconical core is stationary, comprises a seat in which annular orifices are made, at the exit of the external grooves, according to different diameters to avoid any connection between them, has a threaded top for screwing on the nut for fastening it in the block and is positioned normal to the extruders in lines.

Furthermore, the distributor ring is in the shape of a cylindrical ring of the same diameter as that of the seat of the core of the union head, bored out axially with a passage orifice for the insert correspondingly to that of this core and provided, on its face adjacent to the latter, with annular grooves designed to have the same diameters as those of the segmentary annular orifices in the base of this core, these annular grooves being provided with skew perforations opening into orifices provided in the opposite face of this ring and corresponding to the entry orifices of the controlled-stream chamber. It should be noted that this chamber, which is known in extrusion technology, is described, among other places, in EP Pat. No. 0,031,742 and in U.S. Pat. No. 4,347,050. Furthermore, the skew perforations in the annular grooves of the distributor ring are countersunk to receive plug pins as a function of the annular grooves employed in the distribution of the materials being extruded, these grooves being themselves designed to receive material-stop devices distributed according to the allocation of the groove segments chosen for feeding to the entry orifices of the chamber.

Insofar as it is concerned and as it has been defined above, the extrusion head incorporating the die and fitted at the exit of the chamber consists of a frustoconical enclosure incorporating a radially ribbed and grooved frustoconical diffuser, a frustoconical core which is also ribbed and grooved radially correspondingly to the diffuser and a conically hollowed out die into which the ribs of the core abut. The enclosure of frustoconical shape is adapted to be housed in the flange for fastening the extrusion head and has a conical bore which converges towards its exit in order to hold the stacking of the diffuser, the core and the die, as well as a shutter ring placed behind the diffuser and having a bore corresponding to the circle circumscribing the orifices of the extrusion chamber, the rear face of this ring being placed on the front or exit face of this chamber.

For its part, the frustoconical diffuser consists of a single block where the radial ribs, of frustoconical external shape with convergent conicity, provide between them grooves whose bottom has conicity with is divergent in the direction of their exit, the bottoms at the entry being curved within the diameter of the circle inscribed on the exit orifices of the controlled-stream extrusion chamber and these bottoms corresponding, on the exit side, to the external diameter of the frustoconical core. It should be noted that one of the ribs of this diffuser is thicker than the others and comprises an internal air entry channel.

Furthermore, this frustoconical core also consists of a single block where the radial ribs and the bottom of the grooves has conicity which converges towards their exit on the die side, this bottom of each groove being rounded off so that only one generatrix touches the bottom of the die. As for the wall of this die, this is hollowed out conically correspondingly to the conicity of the radial ribs of the core and is machined conically on the outside, parallel to its cavity. It should be noted that the wall of the die is designed to be thin, approximately four millimeters, but nevertheless sufficient for the materials being extruded to be reconstituted within this thickness. It should be stressed, moreover, that, in contrast to the dies known at present, the extruded materials do not strike the inner walls of the extrusion head at 90°, because all these walls are conical in shape, and this enables the extrusion pressure to be lowered. What is more, the contact boundary of these materials can thus be varied by modifying the pressure setting of the extruders.

Furthermore, to facilitate the construction of this extrusion head, the inventor has devised a manufacturing process which consists in making the diffuser, the core and the die in the form of bodies of revolution which can be manufactured in series, and hence of low cost, only the enclosure being designed as a liner to be adjusted to the external diameters of the diffuser and of the die in relation to the bore of the flange for fastening the extrusion head. In particular, for machining the core ribbing and grooving, the inventor has conceived a cast copper electrode which is adapted to fit onto the core blank which is then in the form of a body of revolution.

Other characteristics of the present invention will become apparent from the following description of an embodiment, given by way of example without implying any limitation, of an extrusion machine according to the invention, designed for extruding at the same time three materials for continuous coating of an insert, and shown diagrammatically in the attached drawings.

BRIEF DESCRIPTION OF THE DRAWINGS

FIG. 1 is a sectional general view of an extrusion machine according to the invention;

DESCRIPTION OF THE PREFERRED EMBODIMENTS

Figure 3:
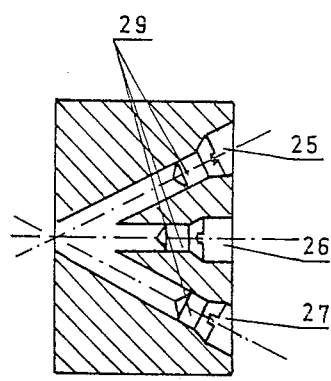
FIG. 3 is a sectional view of the skew perforations in the distributor ring of FIG. 2.

As shown in FIG. 1, the machine for simultaneous extrusion of three materials, which is illustrated, consists of three extruder screws 1, 2, 3 incorporated in the same single block 4 and opening through a corresponding orifice 1', 2', 3' into a union head 5 having three channels 6, 7, 8, each of which corresponds to one of the orifices, and hollowed out axially for an insert to pass through, this union head feeding, via a perforated distributor ring 9, an extrusion enclosure 10 with controlled streams, carrying at its exit an extrusion head 11 consisting of a frustoconical liner or jacket 12, housing, between its entry and its exit, an externally radially ribbed frustoconical diffuser 13, in which each groove between two radial ribs corresponds to an orifice of the extrusion chamber 10, an externally radially ribbed and grooved frustoconical core 13a such that its ribs and grooves correspond to those of the diffuser 13, a frustoconical die 13b hollowed out conically internally correspondingly to the conicity of the radial ribs and grooves of the core 13a, this die obviously comprising a passage cut out to the shape of the desired profile.

Figure 7:
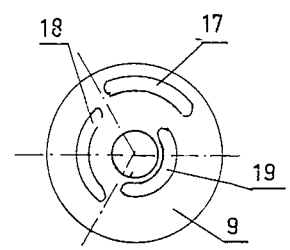
FIG. 7 is a view of the base face A of the frustoconical core of the union head, this face being adjacent to the face B of the distributor ring.

The extruder screws 1, 2, 3 are housed in the bores of the block 4 which are parallel to each other and placed side by side. This block 4 comprises internal channels 14 adapted for circulating water and steam originating from the hydraulic motors for driving the extruder screws in rotation. The union head 5 is an integral part of the block 4 and houses a frustoconical core 15, bored out axially and provided with the external channels 6, 7, 8 in the form of helicoidal grooves opening into its seat 16 through segmentary annular orifices 17, 18, 19 (as can best be seen in FIG. 7) against the distributor ring 9, these annular orifices being distributed concentrically according to different diameters and so that there is no connection between them. At its top, this core 15 additionally comprises a threading enabling a fastening nut 20 to be screwed on.

Figure 2:
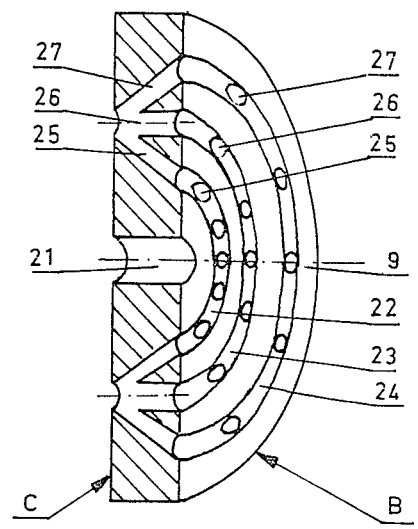
FIG. 2 is a sectional perspective view of the distributor ring.
Figure 4:
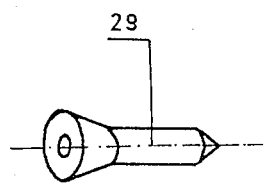
FIG. 4 is a perspective view of a plug pin for a skew perforation of the distributor ring.
Figure 5:
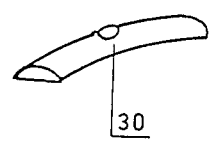
FIG. 5 is a perspective view of a material-stop device for the annular grooves of the distributor ring.
Figure 6:
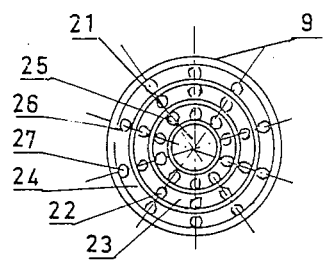
FIG. 6 is a view of the distributor ring from the side of its face B.

As shown in particular in FIGS. 2, 3 and 6, the distributor ring 9 is in the shape of a cylindrical ring of the same diameter as the seat of the core 15 and comprising a central bore 21 for the insert to pass through. On its face B adjacent to the seat of the core 15, this distributor ring 9 has annular grooves 22, 23, 24, made corresponding to and with the same diameters as the segmentary annular orifices 17, 18, 19. These annular grooves additionally comprise skew perforations 25, 26, 27 opening into a corresponding common orifce 28 on the opposite face C of the distributor ring, these common orifices 28 being situated so that they correspond with the entry orifices of the chamber 10. The skew perforations 25, 26, 27 are, in addition, countersunk to accept and house plug pins 29 (FIG. 4) and the annular grooves 22, 23, 24 are adapted for insertion therein of the material-stop devices 30 (FIG. 5) according to the desired distribution into each groove of each material being fed to the chamber as a function of the determined coating of the insert.

No description will be given here of the constitution of the extrusion chamber with controlled streams, since this is described in details, in the abovementioned EP and U.S. patents among other places.

Figure 8:
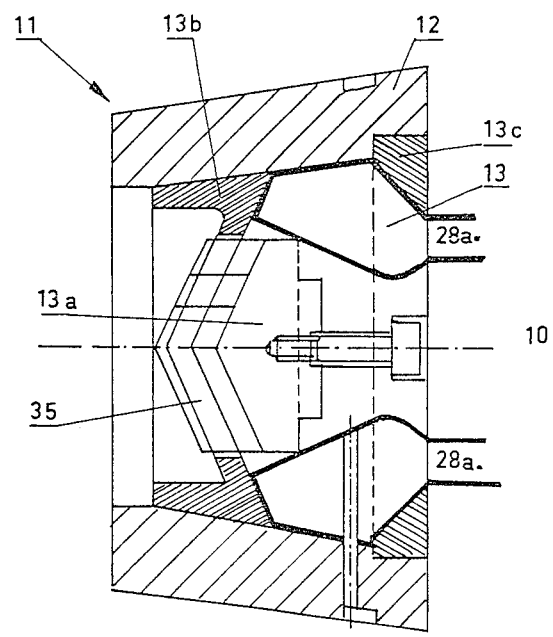
FIG. 8 is a sectional view of the extrusion head.

The extrusion head 11, shown as a whole in FIG. 8, consists, as indicated earlier, of a frustoconical casing 12 incorporating a radially ribbed and grooved frustoconical diffuser 13, a frustoconical core 13a, also radially ribbed and grooved correspondingly with the diffuser and a conically hollowed out die 13b into which the ribs of the core abut. The casing 12 of frustoconical shape is adapted to be housed in the flange 12a for fastening the extrusion head and is bored out conically converging towards its exit in order to hold the stacking of the diffuser, core and die, as well as a shutter ring 13c placed behind the diffuser and in front of a bore corresponding to the circle circumscribed on the orifices 28a of the extrusion chamber, the rear face of this ring 13c being situated flat against the front or exit face of this chamber.

Figure 10:
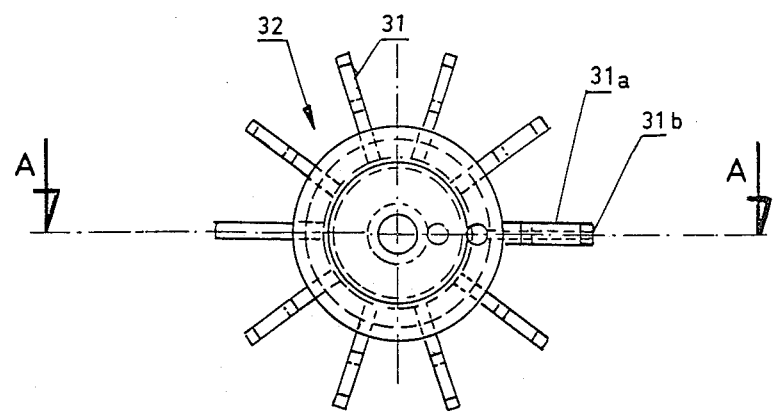
FIG. 10 is a front view, in the direction of the arrow F, of the diffuser shown in FIG. 9.
Figure 9:
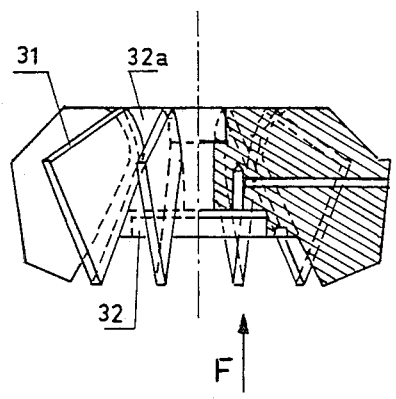
FIG. 9 is a partly sectional elevation view of the diffuser.

For its part, the frustoconical diffuser (shown in FIGS. 9 and 10) consist of a single block where the radial ribs 31, of frustoconical outer shape with convergent conicity, provide between them grooves 32 whose bottom has conicity diverging in the direction of their exit, the bottoms 32a at the entry being curved within the diameter of the circle inscribed in the exit orifices 28a of the controlled-stream extrusion chamber and these bottoms, on the exit side, corresponding to the external diameter of the frustoconical core 13a. It should be noted that one of the ribs 31a of this diffuser is thicker than the others and comprises an internal air entry channel 31b.

Figure 11:
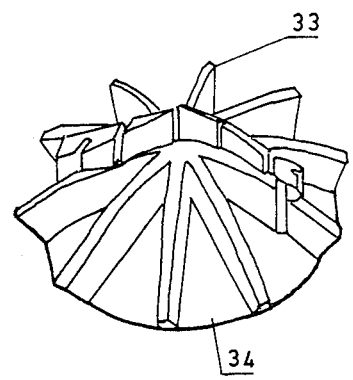
FIG. 11 is a perspective view of the core of the extrusion head in a horizontal position.
Figure 12:
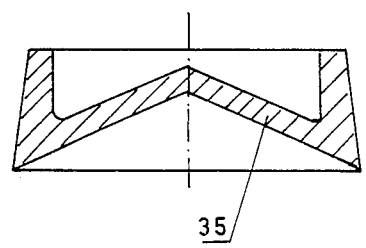
FIG. 12 is a sectional view of the die as such, before the passage for the profile and the insert has been made.

Furthermore, this frustoconical core (shown in FIG. 11) also consists of a single block where the radial ribs 33 and the bottom of the grooves 34 has conicity converging towards their exit on the die side, this bottom of each groove being rounded off so that only one generatrix touches the bottom of the die. Insofar as the wall 35 of this die (shown in FIG. 12) is concerned, this is hollowed out conically correspondingly to the conicity of the radial ribs of the core 13a and is machined conically on the outside parallel with its cavity. It should be noted that the wall 35 of this die is designed to be thin, approximately four millimeters, but nevertheless sufficient for the materials being extruded to be reconstituted within this thickness.

Figure 14:
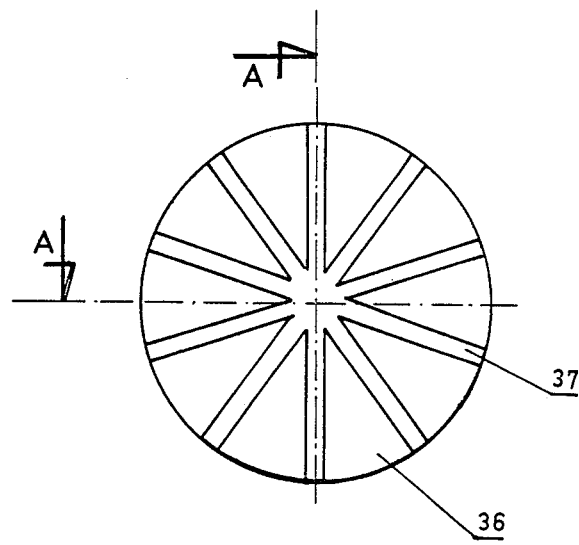
FIG. 14 is a bottom of the electrode in the direction of the arrow F1.
Figure 13:
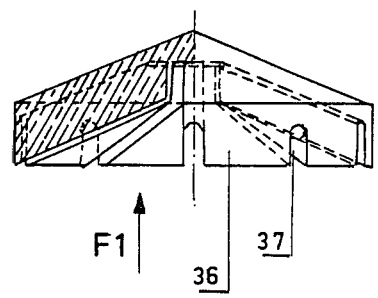
FIG. 13 is a partly sectioned elevation view of the electrode used for machining the core of the extrusion head.

As has been said earlier, the inventor employs a cast copper electrode, shown in FIGS. 13 and 14, for machining the core 13a, which starts from a body of revolution. This electrode comprises radial ribs 36 intended to excavate the grooves 34 while providing between them the radial ribs 33 corresponding to its grooves 37.

I claim:

1. A machine for the extrusion of several materials at the same time, especially adapted for the coating of s profile insert, comprising multiple extruder screws (1, 2, 3) incorporated in the same single block (4), each fed from an individual hopper, and opening out, through a corresponding orifice (1', 2', 3'), into a union head (5) having an individual channel (6, 7, 8) for each material being extruded and hollowed out axially for the insert to pass through, said union head (5) feeding, via a distributor ring (9) perforated and grooved concentrically and positioned downstream of the channels in the union head, an extrusion chamber (10) having orifices with controlled streams, carrying at its exit an extrusion head (11), with a passage reserved for the insert, the extrusion head including a frustoconical liner or casing (12), housing, between its entry and its exit, an externally radially ribbed frustoconical diffuser (13) in which each groove between two radial ribs corresponds to one of said orifices of the extrusion chamber (10), an externally radially ribbed and grooved frustoconical core (13a) such that its ribs and cores correspond to those of the diffuser (13), and a frustoconical die (13b) hollowed out internally so that its conicity corresponds to the conicity of the radial ribs and grooves of the core (13a), said die comprising a passage cut out to the shape of the desired profile.

2. The extrusion machine as claimed in claim 1, wherein the extruder screws (1, 2, 3) are housed in bores in the block (4) which are parallel to each other and placed side by side, this block being provided with internal channels (14) surrounding these screws and circulating water and steam originating from the hydraulic motors for driving these screws in rotation.

3. The extrusion machine as claimed in claim 1, wherein the union head (5) is integral with the block (4) of the extruders and houses a core (15) of frustoconical shape bored out axially to provide a passage for the insert and provided with external grooves (6, 7, 8) of substantially helicoidal shape, opening out through segmentary annular orifices (17, 18, 19) against the distributor ring (9), equal in number to that of the screws and each originating opposite the exit orifice of an extruder.

4. The extrusion machine as claimed in claim 3, wherein the frustoconical core (15) of the union head (5) is stationary, comprises a seat in which said annular orifices (17, 18, 19) are located at the exit of the external grooves, at different diameters in order to avoid any contact between them, has a threaded top for screwing on its nut (20) for fastening in the block (4) and is positioned normal to the extruders (1, 2, 3) in line.

5. The extrusion machine as claimed in claim 4, wherein the distributor ring (9) is in the form of a cylindrical ring of the same diameter as that of the seat of the core (15) of the union head (5), bored out axially with a passage orifice (21) for the insert corresponding to that in said core and provided, on its face adjacent to the latter, with annular grooves (22, 23, 24) provided at the same diameters as those of the segmentary annular orifices (17, 18, 19) of the base of this core, these annular grooves being provided with skew perforations (25, 26, 27) opening into orifices (28) provided in the opposite face of this ring and corresponding with the entry orifices of the extrusion chamber (10).

6. The extrusion machine as claimed in claim 5, wherein the skew perforations (25, 26, 27) in the annular grooves of the distributor ring are countersunk to receive plug pins (29) as a function of annular grooves employed in the distribution of the materials being extruded, these grooves being themselves designed to receive material-stop devices (30) distributed according to the determination of the groove segments chosen for feeding the entry orifices of the chamber (10).

7. The extrusion machine as claimed in claim 1, wherein the casing (12) of the extrusion head (11) is adapted to be housed in a flange (12a) for fastening the extrusion head and is bored out conically converging towards its exit to hold the stacking of the diffuser, core and die, as well as a shutter ring (13c) placed behind the diffuser and having a bore corresponding to the circle circumscribed on the orifices (28a) of the extrusion chamber, the rear face of said shutter ring (13c) being situated flat against the front or exit face of this chamber.

8. The extrusion machine as claimed in claim 1, wherein the frustoconical diffuser consists of a single block in which the radial ribs (31) of frustoconical external shape with convergent conicity, provide between them grooves (32) whose bottom has a conicity divergent towards their exit, the bottoms (32a) at the entry being curved within the diameter of the circle inscribed on the exit orifices (28a) of the extrusion chamber with controlled streams and said bottoms corresponding, at the exit side, to the outer diameter of the frustoconical core (13a).

9. The extrusion machine as claimed in claim 1, wherein the frustoconical core also consists of a single block in which the radial ribs (33) and the bottom of the grooves (34) have conicity convergent towards their exit at the die side, said bottom of each groove being rounded off so that only one generatrix touches the bottom of the die.

10. The extrusion machine as claimed in claim 1, wherein the wall (35) of the die (13b) is hollowed out conically correspondingly with the conicity of the radial ribs of the core (13a), machined conically on the outside in parallel with its cavity and designed to be thin, approximately four millimeters, but nevertheless sufficient for the materials being extruded to be reconstituted within this thickness.

* * * * *

UNITED STATES PATENT AND TRADEMARK OFFICE
CERTIFICATE OF CORRECTION

PATENT NO. : 4,756,682
DATED : July 12, 1988
INVENTOR(S) : BLAISE F. FIGUEREO

It is certified that error appears in the above-identified patent and that said Letters Patent are hereby corrected as shown below:

ON THE TITLE PAGE,

The inventor's name should read:

- BLAISE F. FIGUEREO -

Signed and Sealed this

Sixth Day of December, 1988

*Attest:*

DONALD J. QUIGG

*Attesting Officer*  *Commissioner of Patents and Trademarks*